US012578672B2

(12) United States Patent
Takemura

(10) Patent No.: US 12,578,672 B2
(45) Date of Patent: Mar. 17, 2026

(54) IMAGE FORMING APPARATUS HAVING PLURAL IMAGE FORMING MODES

(71) Applicant: CANON KABUSHIKI KAISHA, Tokyo (JP)

(72) Inventor: Taichi Takemura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/735,901

(22) Filed: Jun. 6, 2024

(65) Prior Publication Data

US 2024/0411256 A1 Dec. 12, 2024

(30) Foreign Application Priority Data

Jun. 8, 2023 (JP) ................................ 2023-094709

(51) Int. Cl.
*G03G 15/00* (2006.01)
*G03G 15/01* (2006.01)

(52) U.S. Cl.
CPC ..... *G03G 15/5041* (2013.01); *G03G 15/0189* (2013.01)

(58) Field of Classification Search
USPC .......................................................... 399/130
See application file for complete search history.

(56) References Cited

U.S. PATENT DOCUMENTS 10,078,290 B2 9/2018 Tomii
10,620,577 B2 4/2020 Takemura
11,758,058 B2 9/2023 Takemura et al.
11,818,304 B2 11/2023 Yokote et al.
11,977,349 B2 5/2024 Yokote et al.
2019/0086851 A1 * 3/2019 Takemura .......... G03G 15/5041

FOREIGN PATENT DOCUMENTS

JP 2017044740 A * 3/2017

* cited by examiner

*Primary Examiner* — Quana Grainger
(74) *Attorney, Agent, or Firm* — Venable LLP

(57) ABSTRACT

An image forming apparatus forms an image on a sheet based on an image forming mode, the image forming mode including a first image forming mode and a second image forming mode for forming an image having a maximum density different from a maximum density of an image in the first image forming mode. The image forming apparatus includes an image processor configured to convert an image signal based on a conversion condition, an image forming unit configured to form an image based on the image signal converted by the image processor, the image forming unit being controlled based on an image forming condition corresponding to the image forming mode, an image bearing member on which a pattern image is to be formed by the image forming unit, and a sensor configured to detect the pattern image formed on the image bearing member.

19 Claims, 11 Drawing Sheets

| DEVELOPING CONTRAST CONVERSION TABLE | | EXPOSURE AMOUNT LPW ($\mu J/cm^2$) | | | | | | | | |
|---|---|---|---|---|---|---|---|---|---|---|
| | | 0.16 | · | 0.20 | · | 0.24 | · | 0.28 | · | 0.32 |
| CHARGING BIAS VOLTAGE (vd) | -700 | 163 | · | 228 | · | 301 | · | 335 | · | 370 |
| | · | · | · | · | · | · | · | · | · | · |
| | -600 | 128 | · | 178 | · | 231 | · | 255 | · | 277 |
| | · | · | · | · | · | · | · | · | · | · |
| | -500 | 90 | · | 125 | · | 160 | · | 175 | · | 189 |

| IMAGE FORMING CONDITION (INITIAL) | CHARGING BIAS VOLTAGE Vd [V] | EXPOSURE AMOUNT LPW [$\mu J/cm^2$] | DEVELOPING CONTRAST Vc [V] | CORRECTION LUT |
|---|---|---|---|---|
| NORMAL MODE | -500 | 0.21 | 129 | LUT_A1 |
| IMAGE DENSITY INCREASING MODE | -575 | 0.21 | 171 | LUT_A1 |

FIG. 16

| DIFFERENCE DENSITY | X<-0.2 | -0.2≦X<-0.15 | -0.15≦X<-0.1 | -0.1≦X<-0.05 | -0.05≦X<-0.02 | -0.02≦X≦0.02 | 0.02<X≦0.05 | 0.05<X≦0.1 | 0.1<X≦0.15 | 0.15<X≦0.2 | 0.2<X |
|---|---|---|---|---|---|---|---|---|---|---|---|
| Vd CHANGE AMOUNT | 150 | 120 | 90 | 60 | 30 | 0 | -30 | -60 | -90 | -120 | -150 |

FIG. 17

| IMAGE FORMING CONDITION (AFTER ADJUSTMENT) | CHARGING BIAS VOLTAGE Vd [V] | EXPOSURE AMOUNT LPW [$\mu J/cm^2$] | DEVELOPING CONTRAST Vc [V] | CORRECTION LUT |
|---|---|---|---|---|
| NORMAL MODE | -560 | 0.21 | 163 | LUT_A2 |
| IMAGE DENSITY INCREASING MODE | -635 | 0.21 | 205 | LUT_A2 |

FIG. 18

IMAGE FORMING APPARATUS HAVING PLURAL IMAGE FORMING MODES

This application claims the benefit of Japanese Patent Application No. 2023-094709, filed Jun. 8, 2023, which is hereby incorporated by reference herein in its entirety.

BACKGROUND OF THE INVENTION

Field of the Invention

The present disclosure relates to an image forming apparatus for forming an image on a sheet, such as a printer, a copying machine, a multifunction peripheral, or a facsimile machine.

Description of the Related Art

Examples of an image forming apparatus include, in addition to an image forming apparatus for household use, an office printing machine mainly used in offices and a production printing machine mainly used in commercial fields. The office printing machine and the production printing machine require different image qualities such as maximum image densities. In recent years, there has been proposed an image forming apparatus providing image qualities required in both of the office printing machine and the production printing machine. Such an image forming apparatus is required to print an image with an image quality suited to usage of a user. For example, in a case where the image forming apparatus is used as the office printing machine, the image forming apparatus prints an image with an image quality for office printing usage, and in a case where the image forming apparatus is used as the production printing machine, the image forming apparatus prints an image with an image quality for production printing usage.

In order to meet such requirements, there is known an image forming apparatus in which a plurality of maximum image densities serving as targets are settable and an image forming condition can be changed depending on each maximum image density. Such an image forming apparatus is disclosed in Japanese Patent Application Laid-open No. 2017-44740. This image forming apparatus forms a toner pattern image between pages to correct an image forming condition for a target image density, and corrects an image forming condition for another target image density by calculating a correction amount without forming the toner pattern image.

In some cases, even in a case where the image forming apparatus corrects the image forming condition, the image density does not become a predetermined image density due to its installation environment and a temporal change of its components. Accordingly, the image forming apparatus executes calibration of correcting a difference between an image density serving as a target and an image density of an actually printed image. In a case of an image forming apparatus for forming a color image, a color balance (what is called a color tone) varies as the image density of each color varies. Accordingly, it is important to suppress variation of the image density of each color. In U.S. Pat. No. 10,078,290, there is disclosed control of adjusting the image forming condition so that the maximum image density becomes the target image density through use of toner pattern images formed under a plurality of different image forming conditions. Examples of the image forming conditions include an exposure amount, a charging bias voltage, and a developing bias voltage.

In the technology as disclosed in Japanese Patent Application Laid-open No. 2017-44740, the image forming conditions for a plurality of target image densities are determined from the toner pattern image obtained under one image forming condition, and hence the correction accuracy is low. In particular, in a case where the correction amount is corrected through use of a table or the like set in advance, the image forming apparatus cannot adapt to a change of a relationship between the image forming condition and the image density due to a change of the state of the image forming apparatus, and thus the correction accuracy is decreased.

In the technology as disclosed in U.S. Pat. No. 10,078,290, it is required to adjust the image forming condition for each maximum image density serving as a target. For example, in a case where there are two types of maximum image densities serving as targets, it is required to perform adjustment control of the image forming condition twice in order to obtain the image forming condition of each type. Similarly, in a case where there are three types of maximum image densities serving as targets, it is required to perform adjustment control of the image forming condition three times. As described above, as the number of maximum image densities serving as targets is increased, the number of times to perform adjustment control of the image forming condition is also increased.

SUMMARY OF THE INVENTION

According to one embodiment of the present disclosure, an image forming apparatus that forms an image on a sheet based on an image forming mode is provided, the image forming mode including a first image forming mode and a second image forming mode for forming an image having a maximum density different from a maximum density of an image formed in the first image forming mode, and the image forming apparatus includes an image processor configured to convert an image signal based on a conversion condition, an image forming unit configured to form an image based on the image signal converted by the image processor, the image forming unit being controlled based on an image forming condition corresponding to the image forming mode, an image bearing member on which a pattern image is to be formed by the image forming unit, a sensor configured to detect the pattern image formed on the image bearing member, and a processor configured to acquire data indicating a correlation between a first image forming condition for the first image forming mode and a second image forming condition for the second image forming mode, control the image forming unit to form a first pattern image, generate the first image forming condition based on a detection result of the first pattern image detected by the sensor, generate the second image forming condition based on the data and the detection result of the first pattern image detected by the sensor, control the image forming unit to form a second pattern image, and generate the conversion condition based on a detection result of the second pattern image detected by the sensor.

Further features of the present invention will become apparent from the following description of exemplary embodiments (with reference to the attached drawings).

BRIEF DESCRIPTION OF THE DRAWINGS

FIG. 16 is an exemplary table of an image forming condition.

FIG. 17 is an explanatory table of a relationship between a difference density and a charging bias change amount.

FIG. 18 is an exemplary table of a new image forming condition.

DESCRIPTION OF THE EMBODIMENTS

Now, referring to the accompanying drawings, description is given of at least one exemplary embodiment of the present disclosure.

Figure 1:
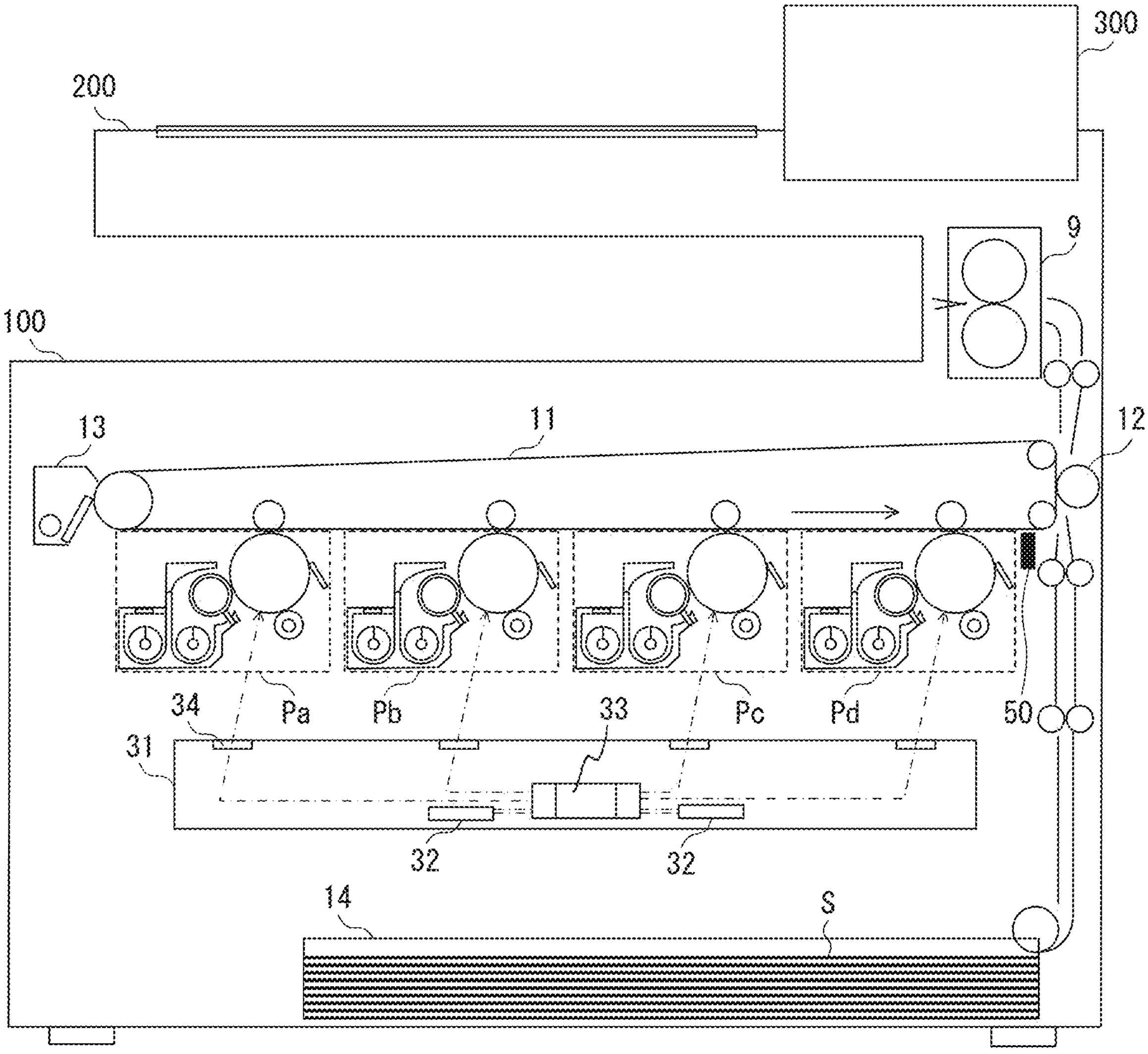
FIG. 1 is a configuration view of an image forming apparatus.

FIG. 1 is a configuration view of an image forming apparatus according to the present disclosure. An image forming apparatus 100 according to the present disclosure forms a color image by an intermediate transfer method. The image forming apparatus 100 is, for example, a laser-beam multifunction peripheral which adopts a contact charging method and a two-component contact developing method and forms an image by an electrophotographic method.

The image forming apparatus 100 includes four image forming units Pa, Pb, Pc, and Pd, a scanner unit 31, an intermediate transfer belt 11, a secondary transfer portion 12, and a fixing device 9. The image forming units Pa, Pb, Pc, and Pd are arranged in series along a rotating direction of the intermediate transfer belt 11. The image forming units Pa, Pb, Pc, and Pd have configurations similar to each other, and are only different in colors of images to be formed. The image forming unit Pa in the present disclosure forms a yellow (Y) image. The image forming unit Pb in the present disclosure forms a magenta (M) image. The image forming unit Pc in the present disclosure forms a cyan (C) image. The image forming unit Pd in the present disclosure forms a black (K) image. Here, the configuration of the image forming unit Pa is described, and description of the image forming units Pb, Pc, and Pd is omitted.

Figure 2:
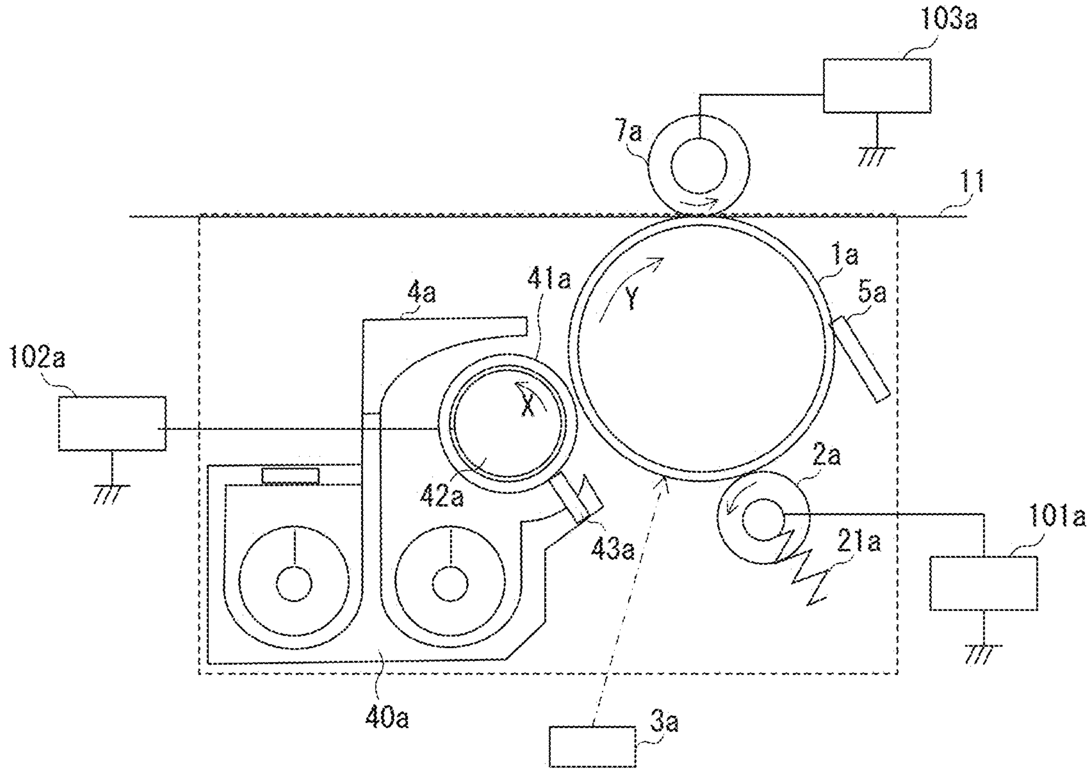
FIG. 2 is a configuration view of an image forming unit.

FIG. 2 is a configuration view of the image forming unit Pa. The image forming unit Pa includes a photosensitive drum 1*a*, a charging device 2*a*, an exposing device 3*a*, a developing device 4*a*, a drum cleaner 5*a*, and a primary transfer portion 7*a*. The suffix “a” after the reference number indicates that the component is a component of the image forming unit Pa. Similarly, in the case of the suffix “b” after the reference number, a component of the image forming unit Pb is indicated. In the case of the suffix “c” after the reference number, a component of the image forming unit Pc is indicated. In the case of the suffix “d” after the reference number, a component of the image forming unit Pd is indicated. The intermediate transfer belt 11 serving as an intermediate transfer member is arranged so as to pass between the photosensitive drums 1*a*, 1*b*, 1*c*, and 1*d* and the primary transfer portions 7*a*, 7*b*, 7*c*, and 7*d* of the respective image forming units Pa, Pb, Pc, and Pd.

The exposing devices 3*a*, 3*b*, 3*c*, and 3*d* are integrally formed in the scanner unit 31. The scanner unit 31 is arranged below the image forming units Pa, Pb, Pc, and Pd, and includes a light source 32, a rotary polygon mirror 33, and an exposure window 34. The light source 32 outputs as many laser light beams as the number corresponding to the colors (in this case, four). The laser light beams output from the light source 32 are scanned by the rotation of the rotary polygon mirror 33. Light fluxes of the scanning light are deflected by a plurality of reflection mirrors to be focused and exposed on meridional lines of the respective photosensitive drums 1*a*, 1*b*, 1*c*, and 1*d* by an fθ lens.

The light source 32 controls light emission of laser light based on a laser drive signal generated from an image signal indicating an image to be formed. The image signal is prepared to correspond to each color. Accordingly, light emission of laser light of each color is controlled based on the image signal of the corresponding color. In this manner, electrostatic latent images of respective colors corresponding to the image signals are formed on the photosensitive drums 1*a*, 1*b*, *c*, and 1*d*.

The developing devices 4*a*, 4*b*, 4*c*, and 4*d* are filled with developers of different colors. In the present disclosure, description is given of an example in which, as the developer, a two-component developer in which non-magnetic toner and magnetic carriers are mixed at a predetermined mixing ratio is used. The developing device 4*a* is filled with a yellow developer. The developing device 4*b* is filled with a magenta developer. The developing device 4*c* is filled with a cyan developer. The developing device 4*d* is filled with a black developer.

The developing devices 4*a*, 4*b*, 4*c*, and 4*d* develop the electrostatic latent images formed on the respective photosensitive drums 1*a*, 1*b*, 1*c*, and 1*d* with developers of corresponding colors to form toner images. The primary transfer portions 7*a*, 7*b*, 7*c*, and 7*d* sequentially transfer the toner images formed on the photosensitive drums 1*a*, 1*b*, 1*c*, and 1*d* onto the intermediate transfer belt 11 in a superimposing manner at the timing corresponding to the arrangement of the photosensitive drums 1*a*, 1*b*, 1*c*, and 1*d* and the rotation speed of the intermediate transfer belt 11. The intermediate transfer belt 11 is an image bearing member for conveying the transferred toner images of the respective colors to the secondary transfer portion 12 through rotation. Toners remaining on the photosensitive drums 1*a*, 1*b*, 1*c*, and 1*d* after transfer are removed by the drum cleaners 5*a*, 5*b*, 5*c*, and 5*d*.

A sheet S on which an image is to be printed is stored in a sheet feeding cassette 14, and is fed to the secondary transfer portion 12 in synchronization with the timing of image formation of each of the image forming units Pa, Pb, Pc, and Pd. The secondary transfer portion 12 collectively transfers the toner images of the respective colors borne on the intermediate transfer belt 11 onto the sheet S. The secondary transfer portion 12 conveys the sheet S having the toner images transferred thereon to the fixing device 9. The fixing device 9 applies heat and pressure to the sheet S having the toner images transferred thereon to fix the toner images to the sheet S. The sheet S having the toner images fixed thereto is discharged to the outside of the image forming apparatus 100 as a printed product.

A belt cleaner 13 is provided on a downstream side of a transfer position (secondary transfer position) of transferring the toner images by the secondary transfer portion 12, in the rotating direction of the intermediate transfer belt 11. The belt cleaner 13 removes fogging toner or toner remaining on the intermediate transfer belt 11 after transfer. The belt cleaner 13 is always in contact with the intermediate transfer belt 11 to clean the intermediate transfer belt 11. An image detection sensor 50 is arranged on an upstream side of the secondary transfer position in the rotating direction of the intermediate transfer belt 11. The image detection sensor 50 detects the toner images borne by the intermediate transfer belt 11.

A document scanner 200 is arranged above the image forming apparatus 100 having such a configuration. The document scanner 200 is an image reading apparatus for reading an image on an original. An operation unit 300 serving as a user interface is further arranged above the image forming apparatus 100.

A process speed of the image forming apparatus 100 of the present disclosure is, for example, 200 mm/sec. The image forming apparatus 100 performs image formation processing based on this process speed. In a case where the image forming apparatus 100 starts the image formation processing, the image forming units Pa to Pd form toner images on the respective photosensitive drums 1*a* to 1*d*. Here, with reference to FIG. 2, an operation of the image forming unit Pa is described. Other image forming units Pb to Pd form toner images by operations similar to that of the image forming unit Pa.

The image forming unit Pa first performs charging processing of uniformly charging the surface of the photosensitive drum 1*a* by the charging device 2*a*. The photosensitive drum 1*a* is a drum-shaped photosensitive member including a photosensitive layer on its surface, and rotates in an arrow Y direction (see FIG. 2) about a drum shaft serving as a center during the image formation processing. The charging device 2*a* has, for example, a roller shape, and both end portions of a core metal are each rotatably held by a bearing member (not shown). The charging device 2*a* is biased toward the photosensitive drum 1*a* by a pressing member 21*a* so as to be in pressure-contact with the surface of the photosensitive drum 1*a* at a predetermined pressing force. In this manner, the charging device 2*a* is rotated in association with the rotation of the photosensitive drum 1*a*.

A high-voltage power supply unit 101*a* is connected to the core metal of the charging device 2*a*. The high-voltage power supply unit 101*a* applies a charging bias voltage in a predetermined condition to the core metal of the charging device 2*a*. In this manner, the surface of the rotating photosensitive drum 1*a* is subjected to contact charging processing with a predetermined polarity to achieve a predetermined potential. In the present disclosure, the charging bias voltage applied to the charging device 2*a* is an oscillating voltage obtained by superimposing a DC voltage and an AC voltage on each other. For example, the charging bias voltage is an oscillating voltage obtained by superimposing, on a DC voltage, an AC voltage being a sine wave having a frequency of 1.3 kHz and a peak-to-peak voltage Vpp of 1.5 kV. In a case where a charging bias voltage having a DC voltage of −600 V is applied, the surface of the photosensitive drum 1*a* is uniformly charged to −600 V (dark potential) which is the same as the DC voltage applied to the charging device 2*a*.

As described above, the image forming apparatus 100 forms the electrostatic latent image by irradiating the charged surface of the photosensitive drum 1*a* with laser light by the exposing device 3*a*. As described above, the image forming apparatus 100 supplies toner to the electrostatic latent image on the surface of the photosensitive drum 1*a* by the developing device 4*a* to form a toner image (developer image).

The developing device 4*a* in the present disclosure employs a two-component contact developing method in which development is performed by bringing a magnetic brush into contact with the photosensitive drum 1*a*. The magnetic brush uses a two-component developer formed of non-magnetic toner and magnetic carriers. Further, the non-magnetic toner in the present disclosure has a negative polarity. The developing device 4*a* includes a developing container 40*a* and a non-magnetic developing sleeve 41*a* as a developer carrier. The developing sleeve 41*a* has a part of an outer peripheral surface thereof exposed to the outside of the developing device 4*a*, and is arranged in close proximity and opposed to the photosensitive drum 1*a* with a closest distance (S-D gap) to the photosensitive drum 1*a* being kept to 260 μm. A part in which the photosensitive drum 1*a* and the developing sleeve 41*a* are opposed to each other serves as a developing portion.

The developing sleeve 41*a* is driven to rotate in an arrow X direction in FIG. 2 by a drive mechanism unit (not illustrated) in an outer circumference of a magnet roller 42*a*. A developer layer thickness regulation blade 43*a* is provided to form a thin layer of the developer on the surface of the developing sleeve 41*a*. A high-voltage power supply unit 102*a* applies a predetermined developing bias voltage to the developing sleeve 41*a*. In the present disclosure, the developing bias voltage is an oscillating voltage obtained by superimposing a DC voltage and an AC voltage on each other. For example, the developing bias voltage is an oscillating voltage obtained by superimposing, on a DC voltage of −450 V, an AC voltage being a square wave having a frequency of 8.0 kHz and a peak-to-peak voltage Vpp of 1.8 kV. The electrostatic latent image is reverse-developed by toner adhering to the electrostatic latent image due to a potential difference between the developing bias voltage and the electrostatic latent image formed on the surface of the photosensitive drum 1*a*.

The image forming apparatus 100 transfers the toner image formed on the photosensitive drum 1*a* onto the intermediate transfer belt 11 by the primary transfer portion 7*a*. The primary transfer portion 7*a* in the present disclosure is formed of a roller. The primary transfer portion 7*a* is brought into pressure-contact with the photosensitive drum 1*a* at a predetermined pressing force across the intermediate transfer belt 11. A high-voltage power supply unit 103*a* applies a transfer bias voltage to the primary transfer portion 7*a*. The transfer bias voltage has a positive polarity that is opposite to the negative polarity being the toner charging polarity. In the present disclosure, as the transfer bias voltage, for example, a DC voltage of +1 kV is applied. Through application of the transfer bias voltage, the toner is transferred from the photosensitive drum 1*a* onto the intermediate transfer belt 11.

Figure 3:
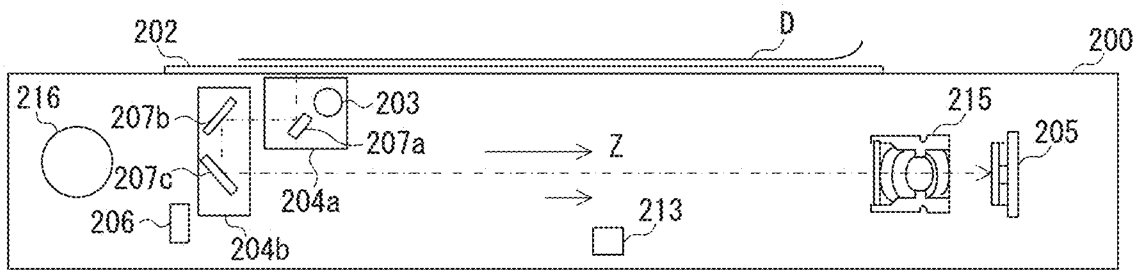
FIG. 3 is a configuration view of a document scanner.

FIG. 3 is a configuration view of the document scanner 200. The document scanner 200 includes, inside of a casing, a first mirror unit 204*a*, a second mirror unit 204*b*, an image sensor 205, a lens 215, a motor 216, an original size detection sensor 213, and a home position sensor 206. The document scanner 200 includes, on the casing, an original table glass 202 on which an original D can be placed. The original size detection sensor 213 is used for size detection of the original D placed on the original table glass 202.

The first mirror unit 204*a* includes an illumination lamp 203 and a first mirror 207*a*. The second mirror unit 204*b* includes a second mirror 207*b* and a third mirror 207*c*. The first mirror unit 204*a* and the second mirror unit 204*b* are movable in a Z direction by being driven by the motor 216.

In a case where the original is to be read, the first mirror unit 204*a* and the second mirror unit 204*b* are driven by the motor 216 to once move to a home position that is a detection position of the home position sensor 206. On the original table glass 202, one original D is placed with its reading surface directed toward the original table glass 202 side, and is fixed onto the original table glass 202 by a platen (not shown) or an auto-document feeder (ADF) unit (not shown).

The document scanner 200 turns on the illumination lamp 203 to apply light to the reading surface of the original D. The first mirror unit 204*a* and the second mirror unit 204*b* cause, while moving in the Z direction, the first mirror 207*a*, the second mirror 207*b*, and the third mirror 207*c* to deflect reflection light (image light) reflected from the original D to guide the reflection light (image light) to the lens 215. The lens 215 images the image light onto a light receiving surface of the image sensor 205. The image sensor 205 converts the image light into an electrical signal. The image of the original D is read as described above.

Figure 4:
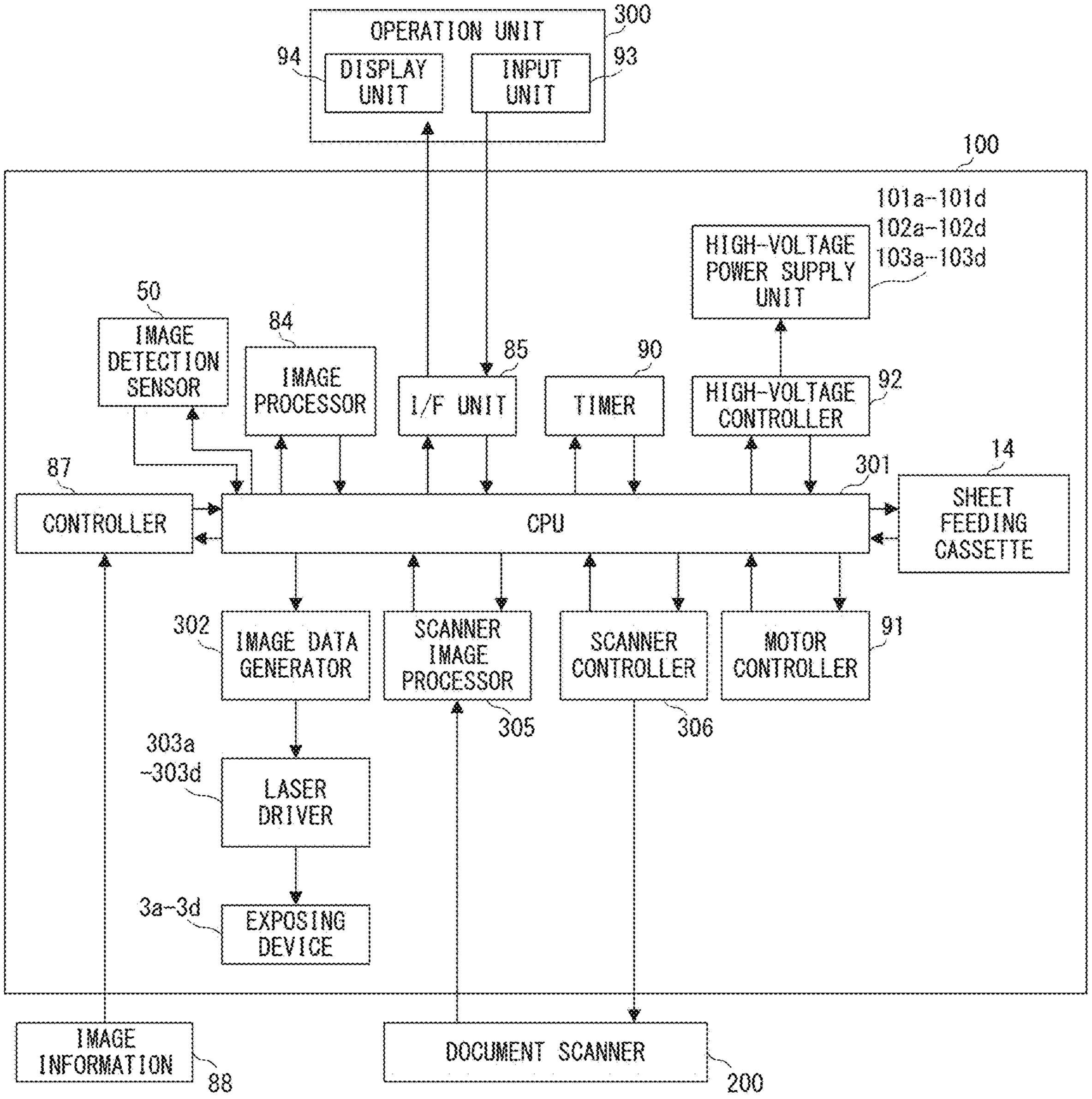
FIG. 4 is an explanatory diagram of a control system.

FIG. 4 is an explanatory diagram of a control system for controlling the operation of the image forming apparatus 100 having such a configuration. In the control system, a central processing unit (CPU) 301 and a controller 87 mainly cooperate with each other to control the operation of the image forming apparatus 100. An image data generator 302, a scanner image processor 305, a scanner controller 306, a motor controller 91, the sheet feeding cassette 14, the image detection sensor 50, an image processor 84, an I/F unit 85, a timer 90, and a high-voltage controller 92 are connected to the CPU 301. Image information 88 is input to the controller 87.

The exposing devices 3*a* to 3*d* are connected to the image data generator 302 via laser drivers 303*a* to 303*d*. The document scanner 200 is connected to the scanner controller 306 and the scanner image processor 305. The operation unit 300 is connected to the I/F unit 85. The high-voltage power supply units 101*a* to 101*d*, 102*a* to 102*d*, and 103*a* to 103*d* are connected to the high-voltage controller 92.

The CPU 301 executes generation of various command signals and arithmetic processing in order to operate various sensors, motors, and the like provided in the image forming apparatus 100 in accordance with an electrophotographic process. Further, the CPU 301 has a built-in memory for storing data therein.

The image data generator 302 is controlled by the CPU 301 to convert the image signal into a laser drive signal for laser control, and transmits the laser drive signal to the laser drivers 303*a* to 303*d*. The image data generator 302 also has a function of generating toner pattern images for various adjustments. The laser drivers 303*a* to 303*d* drive laser elements of the exposing devices 3*a* to 3*d* based on the laser drive signal acquired from the image data generator 302, to thereby control lighting and the light amount of the laser light.

The scanner controller 306 is controlled by the CPU 301 to perform lighting control of the illumination lamp 203 of the document scanner 200 and drive control of the motor 216. The scanner image processor 305 generates an image signal based on the electrical signal acquired from the image sensor 205 of the document scanner 200 to transmit the image signal to the CPU 301.

The motor controller 91 is electrically connected to a plurality of drive motors (not shown), and is controlled by the CPU 301 to control the drive timing and the drive speed of each drive motor. The plurality of drive motors are, for example, drive sources for performing conveyance of the sheet S and rotational drive of the photosensitive drums 1*a* to 1*d*.

The high-voltage controller 92 controls output of various bias voltages required for the image formation process, such as the charging bias voltage, the developing bias voltage, and the transfer bias voltage. Through control performed by the high-voltage controller 92, the output timing, the voltage value, and the like of various bias voltages output from the high-voltage power supply units 101*a* to 101*d*, 102*a* to 102*d*, and 103*a* to 103*d* are controlled.

The timer 90 is controlled by the CPU 301 to count time. The I/F unit 85 is a communication interface between the image forming apparatus 100 and the operation unit 300. The operation unit 300 includes an input interface and an output interface. The input interface is, for example, an input unit 93, such as key buttons and a touch panel. The output interface is, for example, a display unit 94 and a speaker. The CPU 301 receives input such as an instruction from the input unit 93 of the operation unit 300 via the I/F unit 85. Further, the CPU 301 displays various types of information on the display unit 94 of the operation unit 300 via the I/F unit 85. The operation unit 300 may be an external device such as a personal computer connected to the image forming apparatus 100.

The sheet feeding cassette 14 has mounted thereon, for example, a sensor for detecting the presence or absence of the sheet S, and transmits a detection result obtained by this sensor to the CPU 301. The CPU 301 determines whether or not the sheet S is present in the sheet feeding cassette 14 based on this detection result, and, in a case where the sheet S is absent, instructs the user to supply the sheet S through the display unit 94 of the operation unit 300. Further, the CPU 301 performs control of lift-up or the like of the sheet S in the sheet feeding cassette 14.

The image processor 84 acquires the image information 88 from the controller 87 via the CPU 301, and is controlled by the CPU 301 to perform predetermined image processing on the image signal included in the image information 88. The laser drive signal is generated by the image data generator 302 based on the image signal (image information 88) processed by the image processor 84. The image detection sensor 50 is controlled by the CPU 301 to operate, and detects the toner image borne on the intermediate transfer belt 11. The image detection sensor 50 transmits a detection result of the toner image to the CPU 301.

Figure 5:
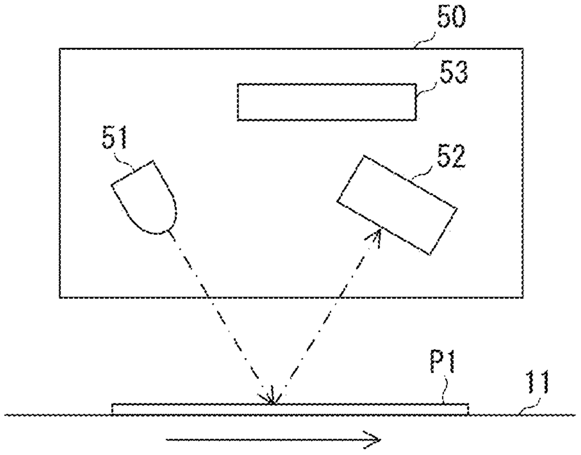
FIG. 5 is an explanatory view of a configuration of an image detection sensor.

FIG. 5 is an explanatory view of the configuration of the image detection sensor 50. The image detection sensor 50 in the present disclosure is an optical sensor of a specular reflection type, and includes a light emitter 51, a light receiver 52, and a controller 53. The light emitter 51 is formed of, for example, a light emitting element such as a light emitting diode (LED). The light receiver 52 is formed of, for example, a light receiving element such as a photodiode. The controller 53 is a semiconductor device for controlling the operation of the image detection sensor 50 based on the instruction from the CPU 301. For example, the controller 53 controls a light emitting amount (illumination light amount) of the light emitter 51.

The light emitter 51 applies light to a surface bearing the toner image of the intermediate transfer belt 11. The light emitter 51 is arranged so as to apply light at an angle of 45 degrees with respect to the normal to this surface. The light receiver 52 is arranged so as to be symmetrical to the light emitter 51 with respect to the normal to this surface serving as a reference. With this arrangement, the light receiver 52 receives specularly reflected light from the background or the toner image of the intermediate transfer belt 11 passing through an irradiation region in which light is applied by the light emitter 51, and outputs a value corresponding to this light reception result (reflected light level). The irradiation region in which light is applied by the light emitter 51 becomes a measurement region of the image detection sensor 50.

FIG. 5 shows a state in which the toner image borne on the intermediate transfer belt 11 passes through the measurement region of the image detection sensor 50. The toner image is, for example, a toner pattern image P1 used for detecting the image density. A detection value that is a detection result of the toner pattern image P1 obtained by the image detection sensor 50 varies depending on the image density of the toner pattern image P1. The CPU 301 converts the detection value of the toner pattern image P1 obtained by the image detection sensor 50 into an image density value. The CPU 301 acquires the image density value from the detection value of the toner pattern image P1 obtained by the image detection sensor 50 through use of, for example, a conversion table between the detection value and the image density value. The conversion table is included in the image processor 84. The conversion table is created based on an output characteristic of the image detection sensor 50. The conversion of the detection value into the image density value may be performed by the controller 53. In this case, the controller 53 transmits the converted image density value to the CPU 301.

In the present disclosure, the image detection sensor 50 has been described as a specular reflection type, but the image detection sensor 50 may be a diffuse reflection type. Further, the image detection sensor 50 may have a configuration obtained by combining the specular reflection type and the diffuse reflection type with each other. In this case, the image detection sensor 50 includes, for example, as the light receiver 52, a light receiving element for receiving the specularly reflected light and a light receiving element for receiving the diffusely reflected light.

<Image Forming Mode>

The image forming apparatus 100 of this the present disclosure has a plurality of image forming modes having different maximum image densities. The plurality of image forming modes include a normal mode and an image density increasing mode. In the normal mode, an image is formed based on an image forming condition that allows the maximum image density to become, for example, 1.50. In the image density increasing mode, an image is formed based on an image forming condition that allows the maximum image density to become, for example, 1.60. The image forming apparatus 100 of the present disclosure is described to have a configuration having two image forming modes, but the image forming apparatus 100 may have a configuration having image forming modes controlled by image forming conditions for achieving three or more different maximum image densities. The image forming apparatus 100 can form an image based on the set image forming mode. Now, an image adjustment method in each of the normal mode and the image density increasing mode is described.

The normal mode is, for example, an image forming mode used for a printed product having printed thereon writing, a graph, or the like, such as a printed product output by the office printing machine. The image density increasing mode is, for example, an image forming mode used for a printed product having printed thereon a photographic image or the like, such as a printed product output by the production printing machine. The normal mode has an advantage in that a toner consumption amount can be reduced as compared to the image density increasing mode. Meanwhile, the image density increasing mode has an advantage in that an image quality of a high-density region can be increased to correspond to that of the production printing machine as compared to the normal mode. The user can select and set such an image forming mode for each job through, for example, a printer driver or the operation unit 300. For example, the image forming apparatus is not limited to have a configuration in which the image forming mode is set for each job as described above, and may have a configuration in which the image forming mode is switched regardless of a job based on the instruction from the user through the operation unit 300.

<Image Density Control>

In the present disclosure, in a case where a user or a service worker inputs an instruction to execute image density control through the operation unit 300, or in a case where a condition such as the cumulative number of times of image forming operation has become a predetermined number of times or more is satisfied, the image density control is performed.

Figure 6:
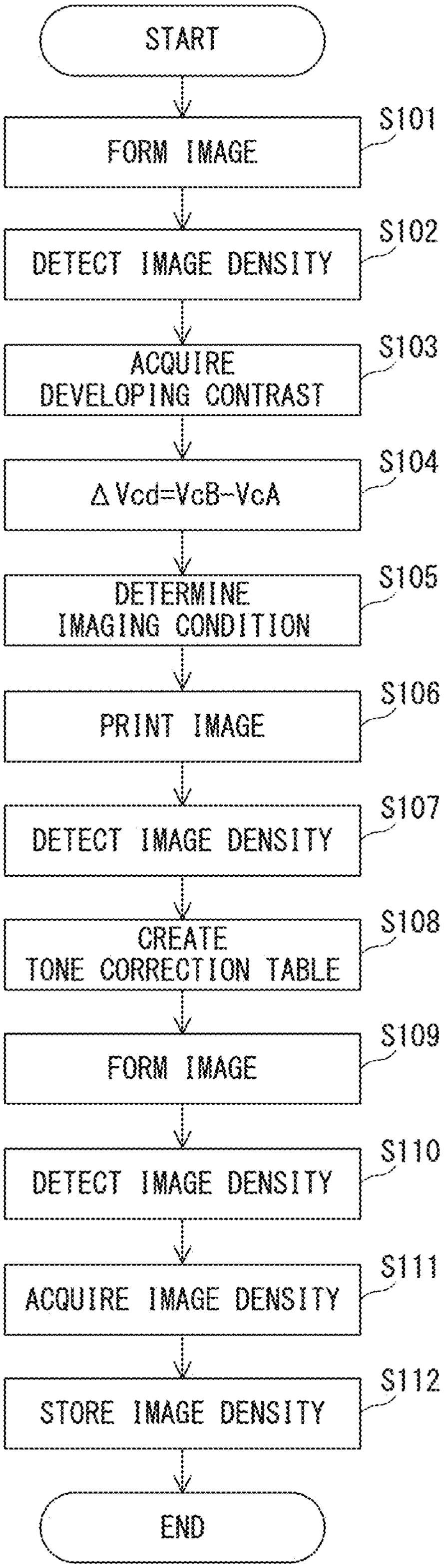
FIG. 6 is a flow chart for illustrating automatic tone correction control processing.

In order to perform the image density control, it is required to acquire an image density target serving as a target of the image density. The image density target for image density control is acquired through automatic tone correction control to be executed based on an instruction given by the user through the operation unit 300. FIG. 6 is a flow chart for illustrating the automatic tone correction control processing including maximum image density control processing. This processing is performed by the CPU 301 executing a computer program stored in a memory of the image processor 84.

The CPU 301 causes the image forming units Pa to Pd to form the toner pattern image P1 for maximum image density control on the intermediate transfer belt 11 (Step S101). The toner pattern image P1 is formed by combining a plurality of pattern images having different image densities with each other. The image forming condition of each pattern image of the toner pattern image P1 is set as follows. In this case, as the image forming condition, a developing contrast Vc, a charging bias voltage Vd, a developing bias voltage Vdc, and an exposure amount LPW obtained by the scanner unit 31 are set, but other items may be included in the image forming condition. In the toner pattern image P1, five pattern images are formed for each of the colors of yellow (Y), magenta (M), cyan (C), and black (K).

Dmax Y1, DmaxM1, DmaxC1, DmaxK1: Vc1, Vd1, Vdc1, LPW1

Dmax Y2, DmaxM2, DmaxC2, DmaxK2: Vc2, Vd1, Vdc1, LPW2

Dmax Y3, DmaxM3, DmaxC3, DmaxK3: Vc3, Vd2, Vdc2, LPW2

Dmax Y4, DmaxM4, DmaxC4, DmaxK4: Vc4, Vd3, Vdc3, LPW2

Dmax Y5, DmaxM5, DmaxC5, DmaxK5: Vc5, Vd3, Vdc3, LPW3

As the charging bias voltage Vd, Vd1 is −500 V, Vd2 is −600 V, and Vd3 is −700 V. As the developing bias voltage Vdc, in consideration of a fog removal potential of 150 V, Vdc1 is −350 V, Vdc2 is −450 V, and Vdc3 is −550 V. As the exposure amount LPW of laser light, a surface light amount on the photosensitive drum 1 is LPW1 of 0.16 μJ/cm$^2$, LPW2 of 0.24 μJ/cm$^2$, and LPW3 of 0.32 μJ/cm$^2$. In the present disclosure, the correction control is performed through use of the pattern images output under the above-mentioned five conditions, but the number of pattern images and the image forming condition are not limited thereto.

Figures 7, 8:
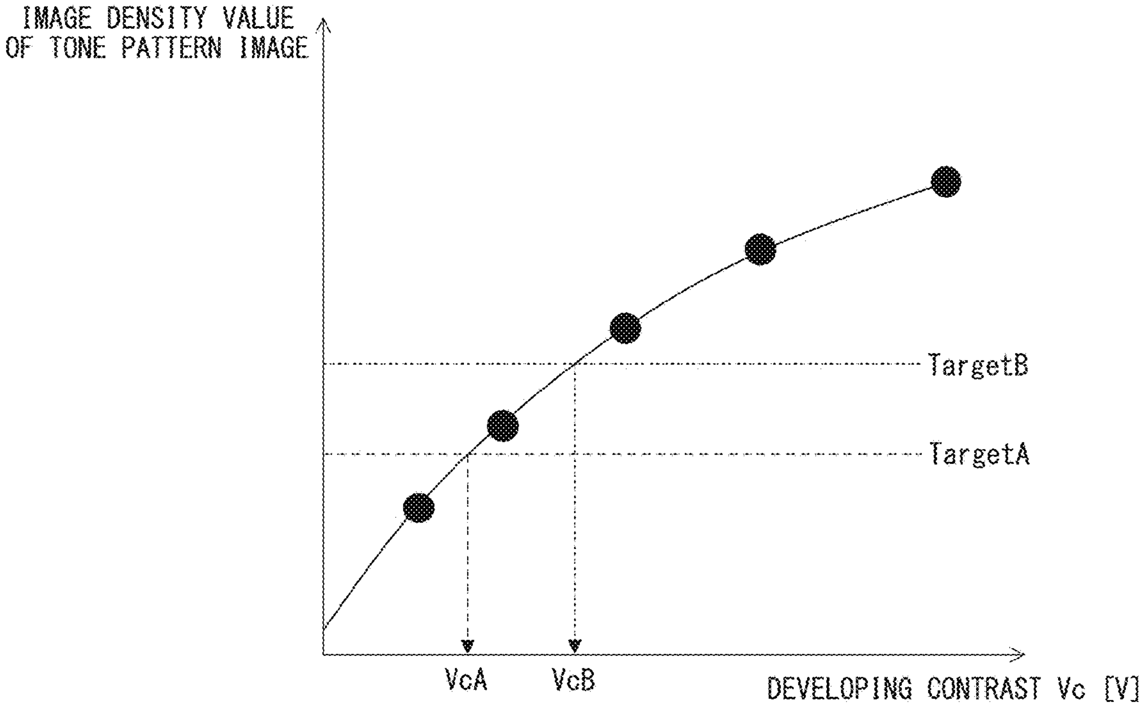
FIG. 7 is an exemplary diagram of a developing contrast conversion table.
FIG. 8 is an exemplary graph of a relationship between an image density value and a developing contrast.

The developing contrast Vc is determined based on the charging bias voltage Vd and the exposure amount LPW. FIG. 7 is an exemplary diagram of a developing contrast conversion table indicating a relationship between the developing contrast Vc, and the charging bias voltage Vd and the exposure amount LPW. The developing contrast conversion table is created in advance in accordance with the characteristic of the photosensitive drum, and is stored in the image processor 84. In the present disclosure, as the developing contrast Vc, Vc1 is 90 V, Vc2 is 160 V, Vc3 is 231 V, Vc4 is 301 V, and Vc5 is 370 V.

The CPU 301 converts the detection result (detection value) of the toner pattern image P1 obtained by the image detection sensor 50 through use of the conversion table between the detection value and the image density value, to thereby detect the image density of each pattern image of the toner pattern image P1 (Step S102). The CPU 301 acquires, based on the detected image density, a developing contrast VcA that becomes an image density target TargetA at the time of the normal mode and a developing contrast VcB that becomes an image density target TargetB at the time of the image density increasing mode (Step S103). TargetA is, for example, "1.50," and TargetB is, for example, "1.60."

FIG. 8 is an exemplary graph of the relationship between the developing contrast Vc and the image density value detected from the toner pattern image P1. The CPU 301 calculates, based on the relationship shown in FIG. 8, the developing contrast VcA indicating the image density target TargetA and the developing contrast VcB indicating the image density target TargetB through linear interpolation between two points sandwiching the targets. In the present disclosure, the developing contrast VcA is 129 V, and the developing contrast VcB is 171 V.

The CPU 301 calculates a difference value ΔVcd between the developing contrast VcA and the developing contrast VcB (Step S104). In the present disclosure, the difference value ΔVcd is 171−129=42 V. The CPU 301 determines an imaging condition A (image forming condition A) for the developing contrast VcA and an imaging condition B (image forming condition B) for the developing contrast VcB (Step S105). In the present disclosure, as an example, with a method of changing the charging bias voltage Vd while keeping the exposure amount LPW with respect to the developing contrast Vc constant as 0.21 μJ/cm$^2$, the imaging condition (image forming condition) is determined through use of the developing contrast conversion table shown in FIG. 7.

In the present disclosure, as the imaging condition A for the developing contrast VcA, the charging bias voltage VdA is −500 V, and the exposure amount LPWA is 0.21 μJ/cm$^2$. As the imaging condition B for the developing contrast VcB, the charging bias voltage VdB is −575 V, and the exposure amount LPWB is 0.21 μJ/cm$^2$.

In this case, the imaging condition is acquired by linear interpolation through use of the developing contrast conversion table of FIG. 7, but the method of acquiring the imaging condition is not limited thereto. Further, the method of determining the imaging condition by changing the developing contrast while keeping the exposure amount constant has a smaller change in γ characteristic as compared to the case in which the exposure amount is changed while the potential setting is kept to be the same, and hence this method is described as a preferred example. However, the method of determining the imaging condition is not limited thereto.

The processing steps of from Step S101 to Step S105 are the maximum image density control processing performed based on the detection result of the toner pattern image P1. With this processing, the imaging condition (image forming condition), such as the developing contrast, the charging bias voltage, and the exposure amount, at the time of image formation by each image forming mode is determined. Tone correction control processing is performed after the maximum image density control processing.

The CPU 301 causes the image forming apparatus 100 to print, on the sheet S, a test image having sixty-four tones of each color to be used for tone correction control (Step S106). The image forming condition at this time is the imaging condition A at the time of the normal mode. In the present disclosure, the imaging condition A (image forming condition A) has the charging bias voltage VdA of −500 V and the exposure amount LPWA of 0.21 μJ/cm$^2$. The number of tones of the test image is not limited thereto. The sheet S having the test image printed thereon is placed on the original table glass 202 of the document scanner 200. The CPU 301 reads the test image printed on the sheet S by the document scanner 200, and detects the image density of the test image based on the reading result of the test image (Step S107).

Figure 9:
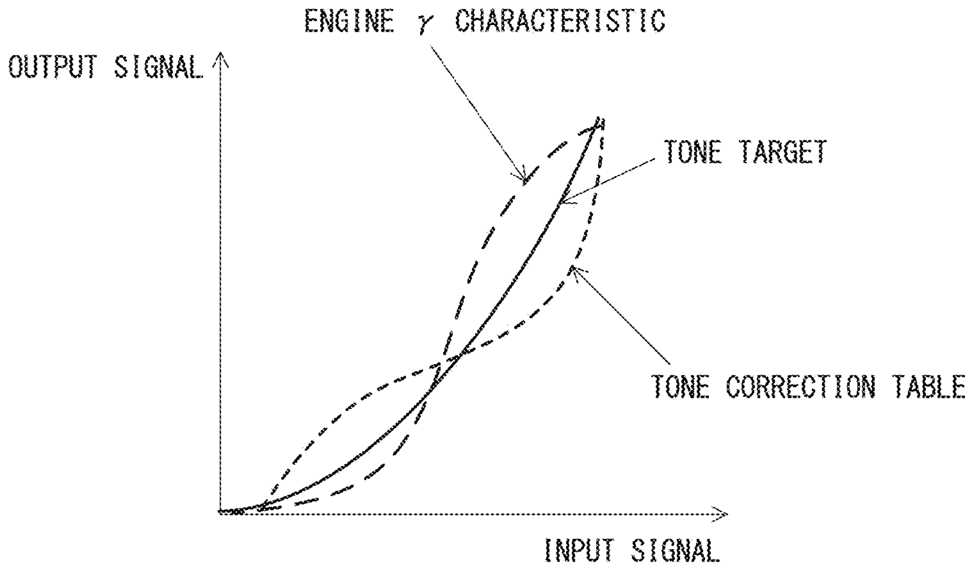
FIG. 9 is an explanatory graph of a tone correction table.

The CPU 301 performs interpolation processing and smoothing processing on the detected image density of the test image to generate an engine γ characteristic (also called "tone characteristic") of the entire image density region. The CPU 301 creates a tone correction table (hereinafter referred to as "initial correction look-up table (LUT)") serving as a conversion condition for converting the image signal so that the generated engine γ characteristic becomes an ideal tone characteristic (tone target) (Step S108). FIG. 9 is an explanatory graph of the tone correction table. In the present disclosure, the tone correction table is created by performing inverse conversion processing on the engine γ characteristic so that the engine γ characteristic matches the tone target. With the tone correction table, the image density of the image on the sheet S matches the tone target in the entire image density region.

The CPU 301 causes the image forming units Pa to Pd to form a toner pattern image for target acquisition (Step S109). In Step S109, the CPU 301 first causes the image processor 84 to convert the image signal for target acquisition based on the tone correction table. Next, the CPU 301 forms, on the intermediate transfer belt 11, a toner pattern image including a plurality of pattern images based on the imaging condition A (image forming condition A), through use of the converted image signal for target acquisition. Then, the CPU 301 detects the image density based on the detection result of the toner pattern image obtained by the image detection sensor 50 (Step S110). The detected image density value becomes the target image density with respect to the image signal at the time of correction control on the intermediate transfer belt 11.

In the present disclosure, the toner pattern image including the pattern images having five tones (30H, 60H, 90H, C0H, FFH) of each color is formed on the intermediate transfer belt 11 after the tone correction table is created. The CPU 301 acquires the image density value of the toner pattern image from the image detection sensor 50 (Step S111). The CPU 301 stores the acquired image density value as the target image density into the memory (Step S112).

Figure 10:
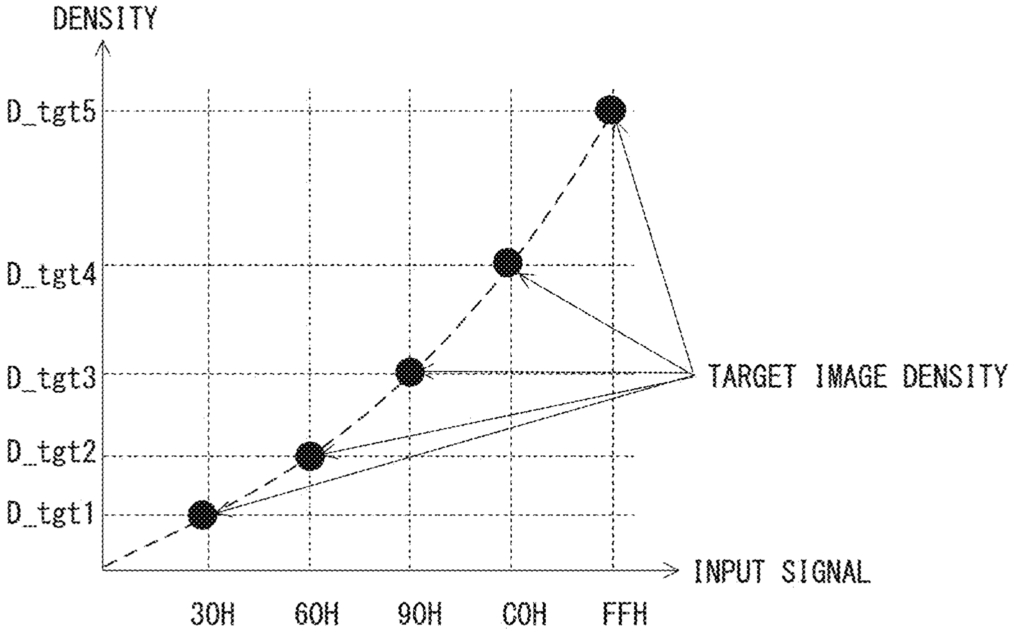
FIG. 10 is an explanatory graph of an example of a target image density.

FIG. 10 is an explanatory graph of an example of the target image density. In this manner, the processing of acquiring the target image density is completed, and the automatic tone correction is ended.

The tone pattern to be created and the number of tones are not limited to those described above, and may be appropriately set as required. For example, the number of pattern images in a middle tone part may be increased so as to mainly correct a middle tone region having a large change in image density due to the engine γ characteristic. Further, in order to stably output the high image density side, the number of pattern images in the high image density region may be increased. Moreover, in order to place importance on a tone characteristic on a highlight side, the number of pattern images in a low image density region may be increased.

<Image Density Adjustment>

The image forming apparatus 100 regularly performs image density adjustment processing in order to stabilize the image density of the image of the printed product. In the image density adjustment processing, a toner pattern image for image density adjustment is regularly formed on the intermediate transfer belt 11 so that the image detection sensor 50 detects this toner pattern image. The detection result of the toner pattern image obtained by the image detection sensor 50 and the above-mentioned target image density are compared with each other, and the detection result is subjected to inverse conversion processing to create a revising table for revising the tone correction table. The image forming apparatus 100 combines the revising table with the tone correction table to update the tone correction table, to thereby stabilize the density of the image formed by the image forming apparatus 100.

Figure 11:
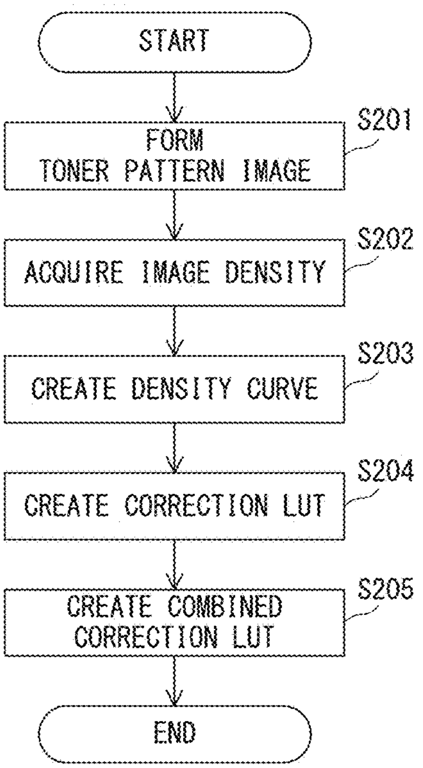
FIG. 11 is a flow chart for illustrating processing of creating the tone correction table.

FIG. 11 is a flow chart for illustrating the processing of creating the tone correction table. The CPU 301 in the present disclosure starts the processing of creating the tone correction table when, for example, the cumulative number of times of image forming operation becomes equal to or larger than a predetermined number. This processing is performed by the CPU 301 executing a computer program stored in the memory of the image processor 84. The processing of creating the tone correction table may be performed when, in addition to the above, time that has elapsed since the end of the previous processing of creating the tone correction table is long, or an installation environment (temperature and humidity) of the image forming apparatus 100 greatly varies. The time that has elapsed since the end of the previous processing of creating the tone correction table is counted by, for example, the timer 90. The variation of the installation environment of the image forming apparatus 100 can be detected by providing, for example, an environment sensor, such as a temperature sensor and a humidity sensor, to the image forming apparatus 100.

The CPU 301 which has started the processing of creating the tone correction table causes the image forming units Pa to Pd to form a toner pattern image for tone correction on the intermediate transfer belt 11 based on the imaging condition A (image forming condition A) (Step S201). At this time, the image processor 84 converts the image signal for tone correction based on the initial correction LUT to generate an image signal for forming the toner pattern image to be used in Step S201. The CPU 301 acquires the image density of this toner pattern image based on the detection result of the toner pattern image obtained by the image detection sensor 50 (Step S202). The toner pattern image is formed by combining a plurality of pattern images having different image densities with each other, and hence the CPU 301 acquires a plurality of image densities corresponding to the respective pattern images.

Figure 12:
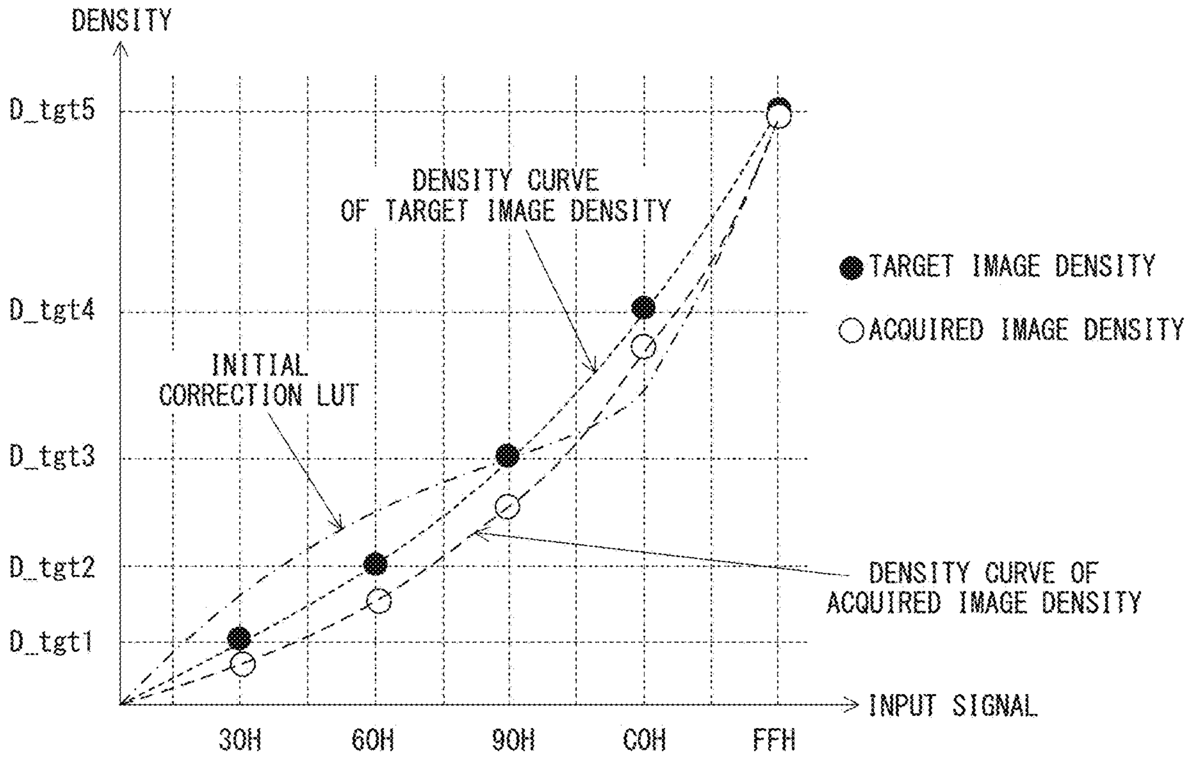
FIG. 12 is an explanatory graph of a density curve.
Figure 13:
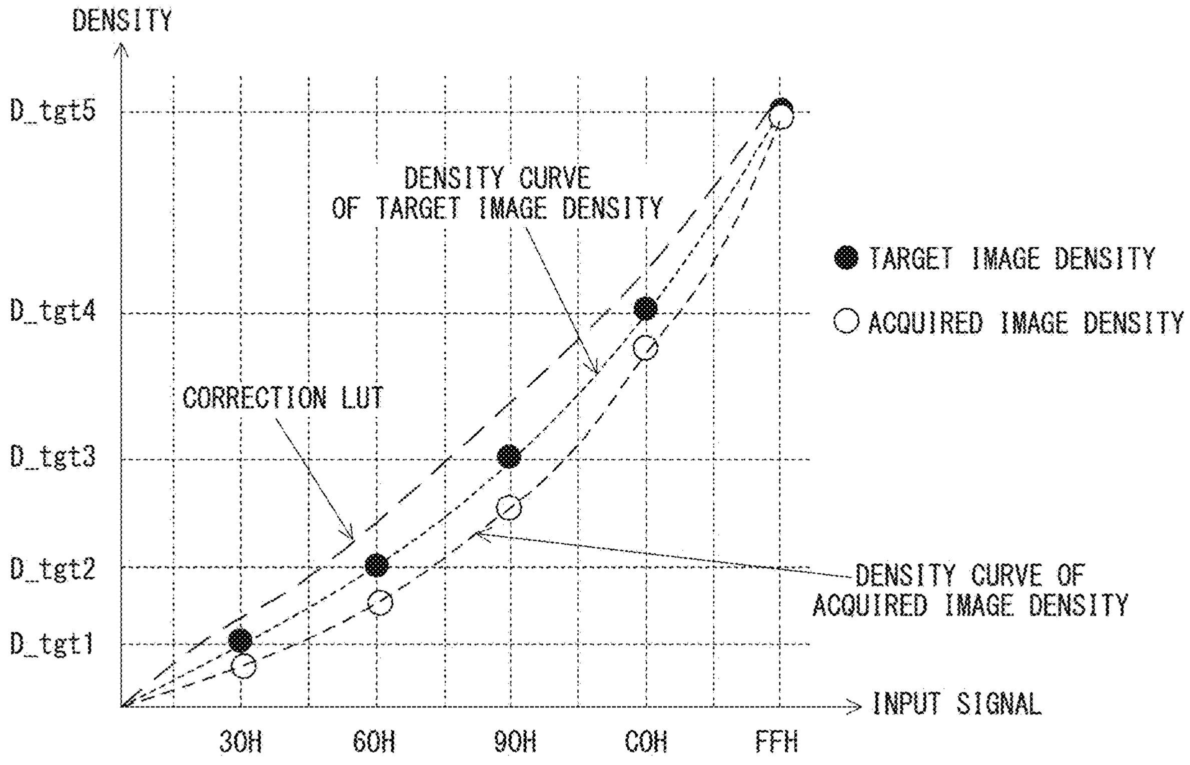
FIG. 13 is an explanatory graph of a correction LUT.

The CPU 301 creates a density curve based on the plurality of acquired image densities (Step S203). FIG. 12 is an explanatory graph of the density curve. The CPU 301 plots the acquired image density for each tone to create the density curve (broken line) with respect to the acquired image densities (white dots). The density curve is created by, for example, a general approximation method such as usage of an approximation expression. The CPU 301 creates the revising table (correction LUT) based on the created density curve (Step S204). FIG. 13 is an explanatory graph of the correction LUT. The CPU 301 creates the correction LUT (long dashed line) by performing inverse conversion to correct the created density curve (broken line) to a density curve (dotted line) of the target image density.

Figure 14:
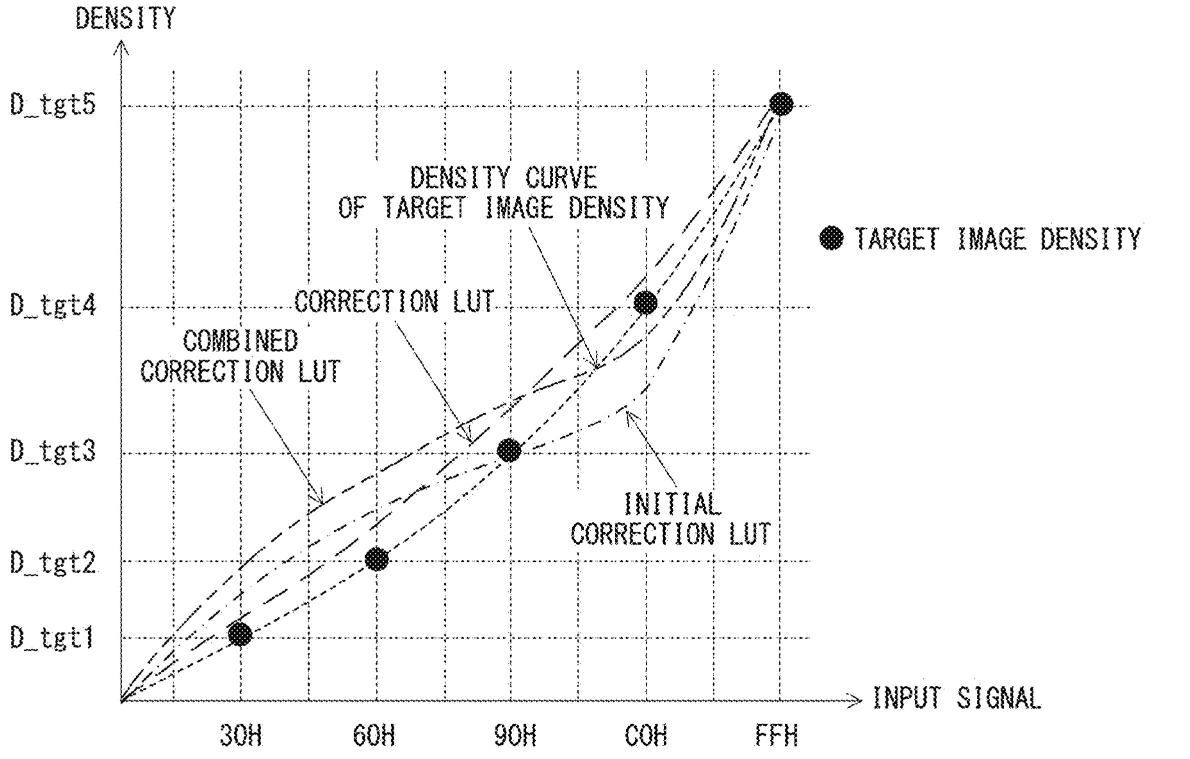
FIG. 14 is an explanatory graph of a combined correction LUT.

The CPU 301 creates the combined correction LUT through use of the created correction LUT and the initial correction LUT (Step S205). FIG. 14 is an explanatory graph of the combined correction LUT. The CPU 301 multiplies the created correction LUT and the initial correction LUT to create the combined correction LUT (long dashed double short-dashed line), and reflects the result in the image of the printed product to output the printed product.

<Image Formation Processing of Printed Product>

Figure 15:
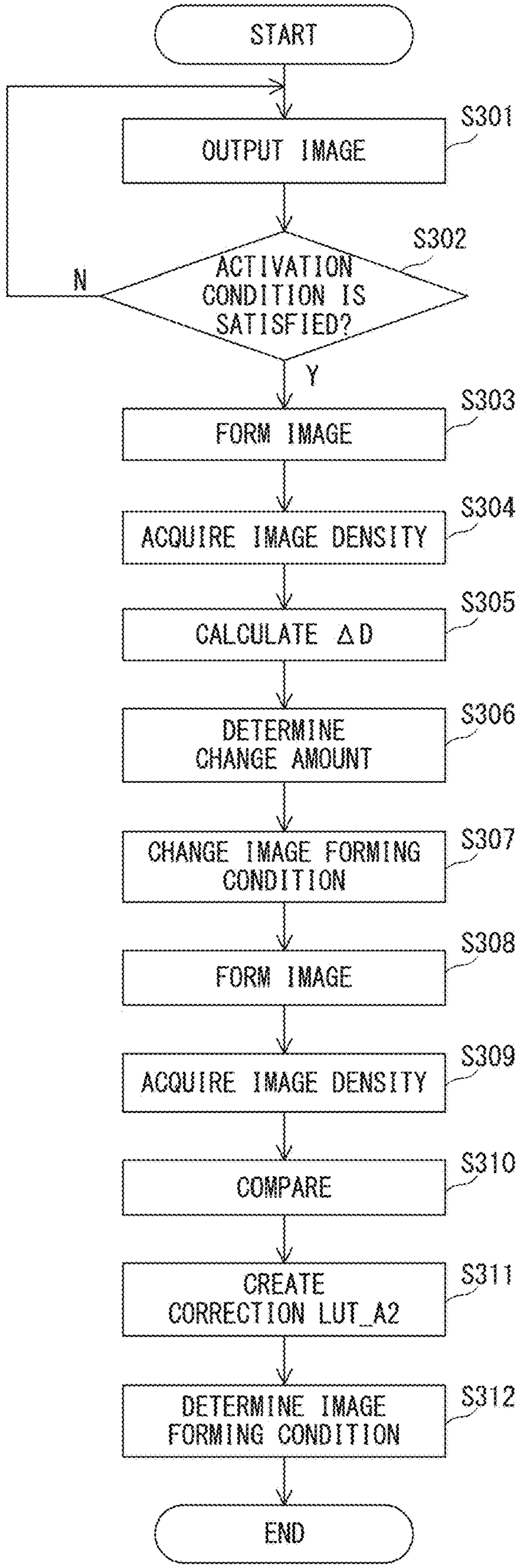
FIG. 15 is a flow chart for illustrating image density adjustment processing.

The imaging condition (image forming condition) of the image forming apparatus 100 of the present disclosure may change due to image density adjustment during the image formation processing. That is, in a case where an image adjustment condition is satisfied during the image formation processing onto the sheet S, the image density adjustment is performed, and thus the imaging condition (image forming condition) is changed. Accordingly, a new imaging condition is determined after the image density adjustment. The image formation onto the next sheet S is performed under the new imaging condition. FIG. 15 is a flow chart for illustrating the image density adjustment processing during the image formation processing. This processing is performed by the CPU 301 executing a computer program stored in the memory of the image processor 84.

The CPU 301 causes the image forming apparatus 100 to form, in accordance with a print job, an image on the sheet S under an image forming condition in the normal mode or the image density increasing mode, and outputs the image (Step S301). The image forming condition at this time (charging bias voltage Vd, developing bias voltage Vdc, and exposure amount LPW) is determined by the above-mentioned automatic tone correction control processing. FIG. 16 is an exemplary table of the image forming condition. This image forming condition is in an initial state after the automatic tone correction control and before the image density adjustment, and the correction LUT is the initial correction LUT. Further, in the present disclosure, it is assumed that the same correction LUT is used at the time of the normal mode and the time of the image density increasing mode. In the present disclosure, the charging bias voltage Vd is changed while keeping the exposure amount LPW constant between the normal mode and the image density increasing mode. Accordingly, the change of the tone characteristic at the time when the maximum image density is changed becomes smaller as compared to that at the time when the exposure amount LPW is changed, and hence the tone characteristic is less liable to be deteriorated even in a case where the same correction LUT is used.

The CPU 301 determines whether or not a predetermined activation condition for executing the image density adjustment has been satisfied during the image formation processing or after the output of the printed product (Step S302). The determination of the activation condition for the image density adjustment is performed based on a value relating to variation of the image density, such as the cumulative number of times of image forming operation, an elapsed time from the previous image density adjustment, a toner amount used for printing, a variation amount of used toner, a toner supplying amount, and an environment change of the image forming apparatus 100. For example, in the case of the cumulative number of times of image forming operation, the CPU 301 determines whether or not the activation condition for the image density adjustment has been satisfied based on whether or not the cumulative number of times has become equal to or larger than a predetermined number of times.

In a case where the activation condition for the image density adjustment is not satisfied (Step S302: N), the CPU 301 continuously performs image formation (Step S301). As another case, in a case where the print job is ended, the CPU 301 directly ends the processing. In a case where the activation condition for the image density adjustment has been satisfied (Step S302: Y), the CPU 301 starts the image density adjustment and causes the image forming units Pa to Pd to form the toner pattern image for maximum image density adjustment on the intermediate transfer belt 11 (Step S303). The CPU 301 acquires the image density of the toner pattern image based on the detection result of the toner pattern image obtained by the image detection sensor 50 (Step S304).

In the present disclosure, regardless of the image forming mode before start of the image density adjustment, the image density adjustment is performed under the image forming condition of the normal mode. Accordingly, the toner pattern image is formed under the image forming condition of the normal mode shown in FIG. 16. The maximum image density adjustment in the present disclosure uses a method of calculating a change amount from a difference between the image density detected from the pattern image having the image density of 100% (FFH), which is the maximum image density, and the target image density of the maximum image density. In the following, description is given assuming that, before the start of the image density adjustment, the image forming condition of the normal mode is an imaging condition A1.

The CPU 301 forms the toner pattern image for maximum density adjustment based on the imaging condition A1, and calculates a difference density ΔD from the image density detected from the toner pattern image for maximum image density adjustment and the target image density (1.50) of the maximum image density (Step S305). The CPU 301 determines the change amount of the image forming condition based on the relationship between the difference density ΔD and the charging bias change amount (Step S306). The CPU 301 changes the image forming condition from the imaging condition A1 to an imaging condition A2 based on the determined change amount of the image forming condition (Step S307).

FIG. 17 is an explanatory table of the relationship between the difference density ΔD and the charging bias change amount. The CPU 301 stores in advance information (table) indicating such a relationship between the difference density ΔD and the charging bias change amount, and determines the change amount of the image forming condition based on this table. The change amount of the image forming condition in this case becomes the change amount of the charging bias voltage Vd.

For example, in a case where the image density detected in a case where the target image density of the maximum image density is "1.50" is "1.42," the difference density ΔD is "−0.08." Accordingly, a change amount ΔVd of the charging bias voltage Vd is +60 V. In this manner, the charging bias voltage Vd that is the image forming condition is changed from 500 V to 560 V.

As the image forming condition after the image density adjustment, the charging bias voltage Vd is changed from −500 V (imaging condition A1) to −560 V (imaging condition A2). Further, as the image forming condition after the image density adjustment, the developing contrast Vc is changed from 129 V (imaging condition A1) to 163 V (imaging condition A2). The exposure amount is not changed. The exposure amount of the imaging condition A2 is, for example, 0.21 μJ/cm$^2$.

In this manner, the maximum image density adjustment is ended. Next, the CPU 301 causes the image forming units Pa to Pd to form a toner pattern image for tone control on the intermediate transfer belt 11 based on the imaging condition A2 (Step S308). The CPU 301 acquires the image density of the toner pattern image for tone control based on the detection result of the toner pattern image for tone control obtained by the image detection sensor 50 (Step S309). The CPU 301 compares the image density acquired in Step S309 and the target image density acquired by the automatic tone correction with each other (Step S310).

The CPU 301 performs the above-mentioned inverse conversion processing based on the comparison result to create a new combined correction LUT (Step S311). In this manner, the correction LUT (LUT_A1) that has been used before the image density adjustment is performed is updated to a new correction LUT (LUT_A2). The CPU 301 determines the image forming condition of each image forming mode (Step S312). That is, not only the imaging condition A2 but also the imaging condition B is determined.

FIG. 18 is an exemplary table of the new image forming condition determined by the processing step (Step S312) of FIG. 15. As described above, the imaging condition A1 of the normal mode is changed to the imaging condition A2. The imaging condition A2 has the charging bias voltage VdA2 of −560 V, the exposure amount LPWA2 of 0.21 μJ/cm$^2$, and the developing contrast VcA2 of 163 V. At this time, the imaging condition B in the image density increasing mode is also determined again without forming the pattern image. It can be said that this operation corresponds to updating of the imaging condition B.

In the present disclosure, at the time of the automatic tone correction, the difference value ΔVcd of the developing contrast between the normal mode and the image density increasing mode is calculated (processing step of Step S104 of FIG. 6). In a case where this difference value ΔVcd of the developing contrast is applied to the developing contrast of the normal mode, the developing contrast of the image density increasing mode is calculated. The difference value ΔVcd is a difference between the image forming condition (imaging condition A) of the normal mode and the image forming condition (imaging condition B) of the image density increasing mode. Further, it can be said that the difference value ΔVcd is data indicating a correlation between the imaging condition A and the imaging condition B.

In this case, the developing contrast of the normal mode after adjustment is 163 V, and the difference value ΔVcd calculated at the time of the automatic tone correction is 42 V. Thus, the newly set developing contrast of the image density increasing mode is 205 V. Moreover, with the above-mentioned processing, the charging bias voltage VdB2 of the image density increasing mode becomes −635 V, and the exposure amount LPWB2 becomes 0.21 μJ/cm$^2$.

As described above, in a case where the image adjustment condition is satisfied during image formation, the image forming apparatus 100 performs image adjustment to determine a new image forming condition, and performs the next image formation under the determined image forming condition. The image forming apparatus 100 performs image adjustment under the image forming condition of the normal mode no matter whether the image forming mode is the normal mode or the image density increasing mode, and determines the new image forming condition of each image forming mode.

The effects of the present disclosure are described. In this case, as a comparative example, a method of calculating the image forming condition of each of the normal mode and the image density increasing mode at the time of the image adjustment in each image forming mode is described.

The image forming apparatus 100 updates, based on the detection result of the pattern image for the normal mode, the image forming conditions of the normal mode and the image density increasing mode without forming the pattern image for the image density increasing mode. Accordingly, the image forming apparatus greatly reduces the adjustment time required for the image adjustment during image formation.

In the image forming apparatus 100 in which a plurality of image forming modes, such as the normal mode and the image density increasing mode, are settable, it is required to determine the image forming condition of each image forming mode through image adjustment. In the present disclosure, the image forming condition of each image forming mode is determined by the processing illustrated in FIG. 15. That is, at the time of the automatic tone correction, the difference value between the image forming conditions of the image forming modes is calculated in advance. At the time of execution of the image adjustment, image adjustment is performed in the image forming mode for which the target image density is acquired at the time of the automatic tone correction, which is the normal mode in the present disclosure, and the image forming condition of the image density increasing mode is determined through use of the image forming condition of the normal mode and the difference value.

Accordingly, the image forming conditions of the normal mode and the image density increasing mode can be corrected without separately executing the image adjustment for the image density increasing mode. When, at the time of the automatic tone correction, the image forming condition for the image density increasing mode is determined and the target image density for the image density increasing mode is acquired, at the time of the image adjustment, the image adjustment is performed by returning to the image forming condition of the image density increasing mode even during the operation in the normal mode. In this manner, the adjustment time is reduced.

Meanwhile, in a case where the image forming condition of each of the normal mode and the image density increasing mode is calculated for each image forming mode at the time of the image adjustment, the following operation is performed. In this case, the processing illustrated in FIG. 15 is performed a plurality of times. In the present disclosure, as described above, the charging bias voltage is changed between the case of the normal mode and the case of the image density increasing mode, instead of changing the exposure amount. Accordingly, the change of the tone characteristic at the time when the maximum image density is changed becomes smaller as compared to that when the exposure amount is changed. Thus, the same LUT is used between the case of the normal mode and the case of the image density increasing mode.

Accordingly, it is not required to create the correction LUT for the image density increasing mode, but it is required to determine at least the developing contrast for the image density increasing mode, and it is required to perform correction arithmetic processing by forming and detecting the pattern image for maximum image density adjustment. From the facts described above, the adjustment of the image forming condition for each image forming mode takes more time as compared to the present disclosure.

As described above, the image forming apparatus 100 of the present disclosure has a plurality of maximum image densities serving as targets, and can change the image forming condition with high accuracy depending on each maximum image density serving as the target. This image forming apparatus 100 can perform correction control on the plurality of image forming conditions corresponding to the plurality of maximum image densities without increasing the control time, regardless of the image forming condition during image formation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus that forms an image on a sheet based on an image forming mode, the image forming mode including a first image forming mode and a second image forming mode for forming an image having a maximum density different from a maximum density of an image in the first image forming mode, the image forming apparatus comprising:

- an image processor configured to convert an image signal based on a conversion condition;
- an image forming unit configured to form an image based on the image signal converted by the image processor, the image forming unit being controlled based on an image forming condition corresponding to the image forming mode;
- an image bearing member on which a pattern image is to be formed by the image forming unit;
- a sensor configured to detect the pattern image formed on the image bearing member; and
- a processor configured to:
  - acquire data indicating a correlation between a first image forming condition for the first image forming mode and a second image forming condition for the second image forming mode;
  - control the image forming unit to form a first pattern image;
  - generate the first image forming condition based on a detection result of the first pattern image detected by the sensor;
  - generate the second image forming condition based on the data and the detection result of the first pattern image detected by the sensor;
  - control the image forming unit to form a second pattern image; and
  - generate the conversion condition based on a detection result of the second pattern image detected by the sensor, wherein the image processor is configured to use the conversion condition in both of the first image forming mode and the second image forming mode.

2. The image forming apparatus according to claim 1, wherein the second image forming mode is an image forming mode in which the maximum density is higher than the maximum density of the first image forming mode.

3. The image forming apparatus according to claim 1, wherein the processor is configured to generate the first image forming condition so that the maximum density of an image to be formed by the image forming unit is a first density, and wherein the processor is configured to generate the second image forming condition so that the maximum density of the image to be formed by the image forming unit is a second density which is higher than the first density.

4. The image forming apparatus according to claim 1, further comprising a reader configured to read a test image formed on a sheet, wherein the processor is configured to execute control of generating both of the first image forming condition and the second image forming condition based on a reading result of the test image read by the reader.

5. The image forming apparatus according to claim 1, wherein the image forming unit includes:

a photosensitive member;

a charging member configured to charge the photosensitive member;

a light source configured to expose the photosensitive member charged by the charging member with laser light in order to form an electrostatic latent image on the photosensitive member; and a developing sleeve configured to develop the electrostatic latent image formed on the photosensitive member through use of toner, and wherein the image forming condition includes a charging bias voltage to be applied to the charging member.

6. The image forming apparatus according to claim 1, wherein the image forming unit includes:

a photosensitive member;

a charging member configured to charge the photosensitive member;

a light source configured to expose the photosensitive member charged by the charging member with laser light in order to form an electrostatic latent image on the photosensitive member; and a developing sleeve configured to develop the electrostatic latent image formed on the photosensitive member through use of toner, and wherein the image forming condition includes an exposure amount of the laser light from the light source.

7. The image forming apparatus according to claim 1, wherein the image forming unit includes:

a photosensitive member;

a charging member configured to charge the photosensitive member;

a light source configured to expose the photosensitive member charged by the charging member with laser light in order to form an electrostatic latent image on the photosensitive member; and a developing sleeve configured to develop the electrostatic latent image formed on the photosensitive member through use of toner, and wherein the image forming condition includes a developing bias voltage to be applied to the developing sleeve.

8. The image forming apparatus according to claim 1, wherein the data corresponds to a difference between the first image forming condition and the second image forming condition.

9. The image forming apparatus according to claim 1, wherein the image forming unit includes:

a photosensitive member;

a charging member configured to charge the photosensitive member;

a light source configured to expose the photosensitive member charged by the charging member with laser light in order to form an electrostatic latent image on the photosensitive member; and a developing sleeve configured to develop the electrostatic latent image formed on the photosensitive member through use of toner, and wherein the data is a difference value between developing contrasts which are determined based on a charging bias voltage to be applied to the charging member and an exposure amount of the laser light from the light source.

10. The image forming apparatus according to claim 4, wherein the test image includes a plurality of images having different densities.

11. The image forming apparatus according to claim 1, wherein the conversion condition is used for correcting a tone characteristic of an image to be formed by the image forming unit.

12. The image forming apparatus according to claim 1, wherein the processor is configured to control whether to form the first pattern image based on the number of times of image forming operation.

13. The image forming apparatus according to claim 1, wherein the processor is configured to control whether to form the first pattern image based on an elapsed time.

14. The image forming apparatus according to claim 1, wherein the image forming unit is configured to form the image through use of toner, and wherein the processor is configured to control whether to form the first pattern image based on an amount of the toner used for image formation by the image forming unit.

15. The image forming apparatus according to claim 1, wherein the image forming unit is configured to form the image through use of toner, and wherein the processor is configured to control whether to form the first pattern image based on a variation amount of the toner used by the image forming unit.

16. The image forming apparatus according to claim 1, wherein the image forming unit is configured to form the image through use of toner, and wherein the processor is configured to control whether to form the first pattern image based on a supply amount of the toner.

17. The image forming apparatus according to claim 1, wherein the processor is configured to control whether to form the first pattern image based on an environment change.

18. The image forming apparatus according to claim 1, wherein the processor is configured to control whether to form the first pattern image based on a value relating to variation of an image density.

19. The image forming apparatus according to claim 1, wherein the first pattern image includes a plurality of images having different densities, the plurality of images being formed based on a plurality of image forming conditions.

* * * * *